(12) United States Patent
Lightstone et al.

(10) Patent No.: US 7,447,681 B2
(45) Date of Patent: Nov. 4, 2008

(54) METHOD, SYSTEM AND PROGRAM FOR SELECTION OF DATABASE CHARACTERISTICS

(75) Inventors: Sam Sampson Lightstone, Toronto (CA); Guy Maring Lohman, San Jose, CA (US); William T. O'Connell, Etobicoke (CA); Jun Rao, San Jose, CA (US); Robin D. Van Boeschoten, Toronto (CA); Daniele Costante Zilio, Georgetown (CA); Calisto Paul Zuzarte, Pickering (CA)

(73) Assignee: International Business Machines Corporation, Armonk, NY (US)

( * ) Notice: Subject to any disclaimer, the term of this patent is extended or adjusted under 35 U.S.C. 154(b) by 409 days.

(21) Appl. No.: 11/060,009

(22) Filed: Feb. 17, 2005

(65) Prior Publication Data

US 2006/0184338 A1    Aug. 17, 2006

(51) Int. Cl.
*G06F 17/30* (2006.01)

(52) U.S. Cl. .................. 707/3; 707/2; 707/5; 707/4; 707/100; 707/101

(58) Field of Classification Search .......... None
See application file for complete search history.

(56) References Cited

U.S. PATENT DOCUMENTS

| | | | | |
|---|---|---|---|---|
| 5,222,235 A | | 6/1993 | Hintz et al. ............... 395/600 |
| 5,404,510 A | | 4/1995 | Smith et al. .............. 395/600 |
| 5,442,784 A | | 8/1995 | Powers et al. ............ 395/600 |
| 5,485,610 A | | 1/1996 | Gioielli et al. ............ 395/600 |
| 5,668,944 A | * | 9/1997 | Berry ........................ 714/47 |
| 5,701,471 A | * | 12/1997 | Subramanyam ........... 707/200 |
| 5,960,423 A | * | 9/1999 | Chaudhuri et al. .......... 707/2 |
| 6,029,163 A | | 2/2000 | Ziauddin .................... 707/2 |
| 6,141,655 A | | 10/2000 | Johnson et al. ............. 707/2 |
| 6,223,171 B1 | * | 4/2001 | Chaudhuri et al. .......... 707/2 |
| 6,341,285 B1 | * | 1/2002 | Blott et al. ................. 707/8 |
| 6,356,889 B1 | | 3/2002 | Lohman et al. ............. 707/2 |

(Continued)

FOREIGN PATENT DOCUMENTS

JP     2002163290     7/2002

OTHER PUBLICATIONS

Rullo, P., et al., *An Automatic Physical Designer for Network Model Databases*, IEEE Transactions on Software Engineering, vol. 14, No. 9, Sep. 1988.

(Continued)

*Primary Examiner*—Don Wong
*Assistant Examiner*—Shyue Jiunn Hwa
(74) *Attorney, Agent, or Firm*—Sawyer Law Group LLP

(57) ABSTRACT

Disclosed is a method for directing a data processing system, the data processing system and an article of manufacture. The data processing system has memory for storing a database. The method directs the data processing system to configuring the database based on a database workload having a performance metric. The method includes selecting a plurality of database characteristics based upon the database workload, each of the database characteristics having an associated estimated performance metric for the database workload, selecting a set of database characteristics from the plurality of database characteristics for which the associated estimated performance metric is lower than the database workload performance metric, and configuring the database using the selected set of database characteristics.

28 Claims, 6 Drawing Sheets

MULTI-DIMENSIONAL CLUSTERING
ANALYSIS TOOL SUB-MODULE

U.S. PATENT DOCUMENTS

| | | | |
|---|---|---|---|
| 6,366,903 B1* | 4/2002 | Agrawal et al. | 707/2 |
| 6,535,872 B1* | 3/2003 | Castelli et al. | 707/3 |
| 6,629,102 B1 | 9/2003 | Malloy et al. | 707/102 |
| 6,957,211 B1* | 10/2005 | Tyulenev et al. | 707/2 |
| 7,007,006 B2* | 2/2006 | Zilio et al. | 707/2 |
| 7,127,456 B1* | 10/2006 | Brown et al. | 707/3 |
| 7,194,452 B2* | 3/2007 | Galindo-Legaria et al. | 707/2 |
| 7,233,939 B1* | 6/2007 | Ziauddin | 707/2 |
| 7,281,004 B2 | 10/2007 | Lightstone et al. | |
| 2002/0077997 A1 | 6/2002 | Colby | 707/1 |
| 2002/0091708 A1 | 7/2002 | Vos et al. | 707/104.1 |
| 2003/0088541 A1* | 5/2003 | Zilio et al. | 707/1 |
| 2004/0068424 A1* | 4/2004 | Lee et al. | 705/7 |
| 2004/0236757 A1* | 11/2004 | Caccavale et al. | 707/100 |
| 2005/0015641 A1* | 1/2005 | Alur et al. | 714/2 |
| 2005/0086242 A1* | 4/2005 | Ngai et al. | 707/100 |
| 2005/0086246 A1* | 4/2005 | Wood et al. | 707/101 |

OTHER PUBLICATIONS

Wu Wen-chuan, et al., *A Graphic Database Based Network Topology and Its Application*, Power System Technology vol. 26, No. 2, Feb. 2002, Abstract in English.

DeKimpe, D., et al, *Method, System, and Program for Improving Performance of Database Queries*, U.S. Appl. No. 10/410,793, filed Apr. 9, 2003.

Malloy, W., et al, *Method, System, and Program for Specifying Multidimensional Calculations for a Relational OLAP Engine*, U.S. Appl. No. 10/341,763, filed Jan. 13, 2003.

Jeffrey O. Kephart, "The Vision of Autonomic Computing", Computer, Jan. 2003, pp. 41-50, 0018-9162/03, Published by the IEEE Computer Society.

Lightstone et al., Automated Design of Multidimensional Clustering Tables for Relational Databases, 30th VLDB Conference, 2004, pp. 1170-1181, Toronto, Canada.

Rao et al., Automating Physical Database Design in a Parallel Database, AC SIGMOD, Jun. 4-6, 2002, pp. 558-569, ACM 1-58113-497-5/02/06, Madison, US.

Valentin et al., DB2 Advisor: An Optimizer Smart Enough to Recommend Its Own Indexes, 10 pages.

Zilio et al., DB2 Design Advisor: Integrated Automatic Physical Database Design, 30th VLDB Conference, 2004, pp. 1087-1097, Toronto, Canada.

Zilio et al., Recommending Materialized Views and Indexes with the IBM DB2 Design Advisor, 8 pages.

* cited by examiner

MULTI-NODE PARTITIONS
ANALYSIS TOOL SUB-MODULE

US 7,447,681 B2

METHOD, SYSTEM AND PROGRAM FOR SELECTION OF DATABASE CHARACTERISTICS

FIELD OF INVENTION

The present invention relates to the field of database management systems and more particularly to a method, system and computer program product for selection of database characteristics.

BACKGROUND

To access the data contained in databases, such as an SQL (structured query language) database, statements (that includes queries, insert, updates, and deletes) are used by a database management system (DBMS). A collection of these statements which are to be executed by the DBMS against the database is known as a workload. Database characteristics such as the database structure and system configuration can impact the performance of workload when executed against the database.

Database analysis tools have been developed which aid in the selection of database characteristics such as materialized views, indexes, multi-node partitions and multi-dimensional clusters that will improve the workload performance against the database.

Individual analysis tools are utilized to improve workload execution relative to a performance metric by aiding in the selection of improved database characteristics. The individual database characteristics are provided as design recommendations for the modification of the database's structure. Characteristics such as materialized views and indexes, multi-dimensional clustering and multi-node partitioning can be individually implemented to improve the design of a database thus improving the execution cost of the workload. These analysis tools are implemented independently and only provide individual design recommendations. The design recommendations provided by analysis tools are generated independently of one another and do not take into account overall execution costs of the analysis tools or the impact of previously selected characteristics. In addition, the interaction or dependencies between the characteristics selected by individual analysis tools are not accounted for, and can have a significant impact on the resulting database characteristics design recommendations and utilization of resources.

In order to reduce the cost of executing analysis tools based upon metrics such as, for example, execution time, compression techniques have also been developed for compressing workloads by reducing a large set of statements to a smaller set of statements which adequately represent the overall workload. Typically, the more complex a statement in a workload is, (i.e. the higher execution cost) the more benefit will be obtained in terms of execution cost of the analysis tool by utilizing a compressed workload. In general, the analysis tool should concentrate upon those statements that contribute the most to the total time to execute a workload, i.e. the statements that currently incur the highest execution cost. Even though the analysis tool might be able to improve lower cost statements or queries by a significant percentage, such improvements will have minimal impact on the overall absolute cost to execute the given workload, and so the statements that have lower execution cost can be omitted in the compressed workload to reduce the execution time of the analysis tool. Compression may be implemented prior to execution of the analysis tool in order to decrease execution time.

Therefore, there is a need for a method, system and computer program product that selects database characteristics such as materialized views and indexes, multi-dimensional clusters and multi-node partitions for a database that will result in an a reduced workload execution cost.

SUMMARY

In accordance with one aspect of the present invention, there is provided for a data processing system having memory for storing a database, a method of directing the data processing system to configure the database based on a database workload having a performance metric, the method including selecting a plurality of database characteristics based upon the database workload, each of the database characteristics having an associated estimated performance metric for the database workload, selecting a set of database characteristics from the plurality of database characteristics for which the associated estimated performance metric is lower than the database workload performance metric, and configuring the database using the selected set of database characteristics.

In accordance with another aspect of the present invention, there is provided for a data processing system having memory for storing a database, an article of manufacture for directing the data processing system to configure the database based on a database workload having a performance metric, the article of manufacture including a data processing system usable medium, code tangibly embodied in the data processing system usable medium, the code for directing the data processing system, the code including code for selecting a plurality of database characteristics based upon the database workload, each of the database characteristics having an associated estimated performance metric for the database workload, code for selecting a set of database characteristics from the plurality of database characteristics for which the associated estimated performance metric is lower than the database workload performance metric, and code for configuring the database using the selected set of database characteristics.

In accordance with yet another aspect of the present invention, there is provided a data processing system having memory for storing a database, the data processing system for configuring the database based on a database workload having a performance metric, the data processing system including means for selecting a plurality of database characteristics based upon the database workload, each of the database characteristics having an associated estimated performance metric for the database workload, means for selecting a set of database characteristics from the plurality of database characteristics for which the associated estimated performance metric is lower than the database workload performance metric, and means for configuring the database using the selected set of database characteristics.

BRIEF DESCRIPTION OF DRAWINGS

A better understanding of these and other embodiments of the present invention can be obtained with reference to the following drawings and detailed description of the preferred embodiments, in which.

Figure 1:
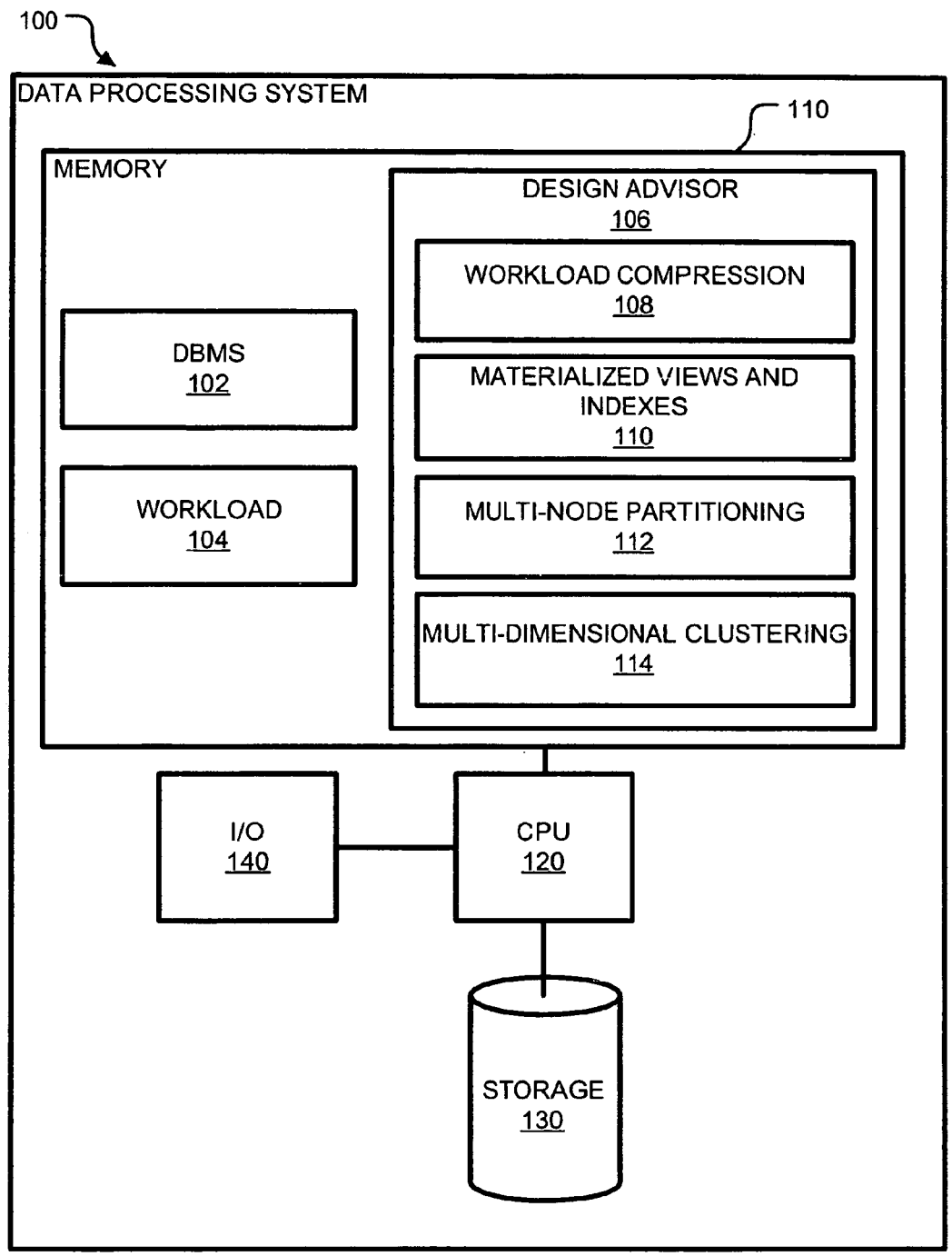
FIG. 1 is a schematic representation of an exemplary embodiment of a design advisor for compressing a workload and selecting database characteristics to be processed by a database management system according to the present invention.

Similar references are used in different figures to denote similar components.

DETAILED DESCRIPTION

A DBMS (used to manage a database) may reduce the cost of executing a database workload against the database by optimizing characteristics of the database through implementing design recommendations provided by analysis tools. Examples of database characteristics are: materialized views and indexes present in the database, multi-node partitioning for taking advantage of the processing nodes available and multi-dimensional clustering created within the database to improve performance. Other exemplary characteristics that may be considered but are not discussed in detail are data fragmentation, statistics profiles, generated columns, and constraint functional dependencies.

In order to reduce the execution cost of the analysis tools used in the optimization of database characteristics, workload compression may be performed on the workload prior to analysis. Compression includes taking the workload containing a large set of statement and reducing it to a smaller set of statements. The compressed workload enables reduction of the execution time of the analysis tool compared to the uncompressed workload, while still achieving substantially the same results as if the uncompressed workload was used in the analysis.

An embodiment of the present invention provides a method of improving the execution cost of a workload on a database by selecting database characteristics which optimize the database structure relative to the workload. The method can be performed by a design advisor module which contains sub-modules or functions required for execution of the analysis tools used within the method. Initially, the structure of the database and system characteristics are determined and/or provided to a design advisor module. The design advisor then estimates a cost of execution of the workload against the database according to a defined performance metric such as execution time, disk space or memory consumption. The workload may then be compressed using a selected compression method provided by the sub-modules. The workload is then provided to the selected analysis tool or to multiple tools to facilitate database characteristic selection. For example, if the analysis tool that performs the materialized views and indexes method is selected, a candidate set of materialized views and indexes are generated based upon the provided workload. The analysis tools are executed and a recommended set of database characteristics such as materialized views, indexes, multi-dimensional clustering and multi-node partitioning are provided. The selection of which analysis tools that are to be executed, and the order by which they are executed, is configurable. Tools may be executed in an order which will help achieve the optimal characteristics selection relative to the analysis tools that have been selected for execution.

In executing each analysis tool, the workload execution cost against the database, for a defined performance metric, is estimated to determine if there is an overall improvement. If for example, the selected materialized views and indexes reduce the execution cost of the workload, they are stored; if there is no improvement they may be discarded. In addition, any database characteristics that may have been selected previously by other analysis tools may be discarded if they adversely affect the execution cost or are negatively impacted by the selection of other characteristics based upon interdependencies between characteristics. The interdependencies between characteristics may be defined as strong or weak. The analysis tools may be executed in relative groups to determine the best combination of characteristics based upon the dependencies between the characteristics selected. The execution of the analysis tool sub-modules, such as the materialized views and indexes, multi-node partitioning and multi-dimensional clustering, data fragmentation, statistics profiles, generated columns, and constraint functional dependencies are executed until one or more criteria are exceeded such as an amount of disk storage, memory consumption or time allocated to execution of the method, or the workload execution cost relative to the selected performance metric can no longer be improved.

If multiple analysis tools have been chosen for execution, the next analysis tool is selected, such as for example the multi-node partitions analysis tool. The candidate partitions are selected using a multi-node partitioning sub-module, and once again the workload execution cost is estimated. If the workload execution cost is reduced, the partition recommendations are stored. Finally the multi-dimensional clustering analysis tool may be selected etc. The method is halted when the chosen analysis tools have been executed and the stop criteria have been met. The current design recommendations are then presented by the design advisor system. The recommended database characteristics can then be implemented in the configuration of the database. The selection of database characteristics may be iteratively performed or the characteristics selected by grouping characteristics based upon defined interdependencies between characteristics. The groups can then be iterated to determine that characteristics which provide the lowest execution cost.

The following detailed description of the embodiments of the present invention does not limit the implementation of the embodiments to any particular computer programming language. The computer program product may be implemented in any computer programming language provided that the OS (Operating System) provides the facilities that may support the requirements of the computer program product. A preferred embodiment is implemented in the C or C++ computer programming language (or may be implemented in other computer programming languages in conjunction with C/C++). Any limitations presented would be a result of a particular type of operating system, computer programming language or data processing system and would not be a limitation of the embodiments described herein.

FIG. 1 shows an exemplary embodiment of a database advisor module 106 for selecting database design changes to a database for optimizing the execution cost of a workload 104 for subsequent processing by a database management system (DBMS) 102. The database advisor module 106 includes computer executable code which is tangibly embodied in memory 110 of a data processing system 100. The computer executable code of the database advisor module 106 encompasses sub-modules or functions which represent the analysis tools used to recommend characteristic changes to the database structure to improve the execution cost of the workload 104 against the database. The sub-modules or functions comprise but are not restricted to a workload compression method 108, analysis tools such as a materialized view and index selection method 110, a multi-node partitioning method 112, and a multi-dimensional clustering method 114. The computer executable instructions can be, for example, compiled by a code compiler from high level computer programmed instructions written in a high level computer programming language. The hardware elements of the data processing system 100 support and execute the computer executable code included in the database advisor system 106. The data processing system 100 includes a central processing unit (CPU) 120 that provides main processing functionality. A memory 110 is coupled to CPU 120 for providing operational storage of programs and data.

Memory 110 may comprise, for example, random access memory (RAM) or read only memory (ROM). Non-volatile storage of, for example, data files and programs is provided by storage 130 that may comprise, for example, disk storage for storing the database for example. The database can also reside outside of the data processing system 100 and may further be distributed in multiple locations. Both memory 110 and storage 130 comprise a computer useable medium that may store computer program products in the form of computer readable program code.

User input and output is provided by an input/output (I/O) facility 140. The I/O facility 140 may include, for example, a graphical display, a mouse and/or a keyboard.

Figure 2:
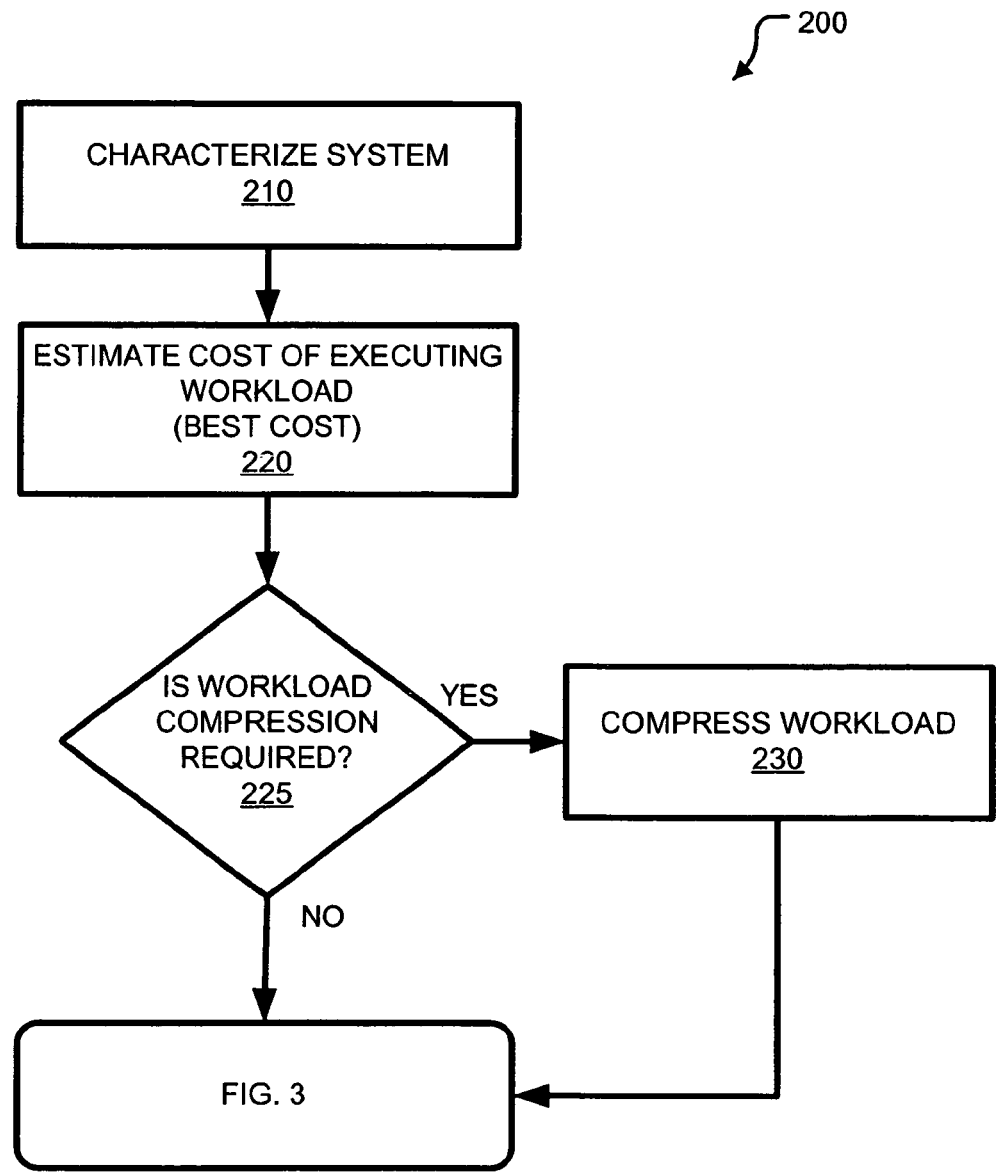
FIG. 2 is a flow diagram showing operations in an exemplary embodiment of a method according to the present invention for selection of database characteristics that can be implemented in the design advisor system of FIG. 1.

FIG. 2 is a flow diagram showing operations in an exemplary embodiment of a method according to the present invention that can be implemented in the database advisor system 106 of FIG. 1. At step 210 the characterization of the database, system, and workload occurs. This includes analysis of the structure of the workload 104, characterization of the database and operational environment, and determination of any execution constraints on the design advisor module 106 and its sub-modules (108, 110, 112 and 114) by parameters such as available disk storage, memory consumption, allotted execution time or by user selected configuration parameters. At step 220, an estimate of the cost of executing the workload 104 for the selected performance metric, given the existing database configuration, is made. This estimate is identified as 'best cost'. The estimated execution cost can be determined against performance metrics such as, for example, execution time, I/O usage, CPU utilization, network utilization, memory consumption or throughput contribution per statement, etc. The estimated cost may also include a weighting factor assigned to individual statement or statement types.

If the workload 104 is to be compressed prior to execution of the analysis tools (YES at 225), compression is performed at step 230 by the workload compression sub-module. If compression is not required (NO at 225), the method continues with the analysis tool selection at step 310. In an exemplary embodiment of the method of the workload compression 108 sub-module, according to an embodiment of the present invention, the most costly statements may be selected relative to the cost of execution metric selected to form the compressed workload for use by the analysis tools sub-modules. The statements of the compressed workload adequately represent the overall workload while enabling faster execution of the analysis tool modules. The determination of what constitutes the most costly statements is dependent on the particular implementation of the method of the workload compression sub-module selected. For example, the most costly statements may be selected as a percentage of total execution time available or a set percentage of the total number of statements, i.e. 40% of the most expensive statements will form the compressed workload. The selection of the compressed workload can be performed by any number of compression techniques such as provided in IBM's DB2 v8.2 Design Advisor™.

Figure 3:
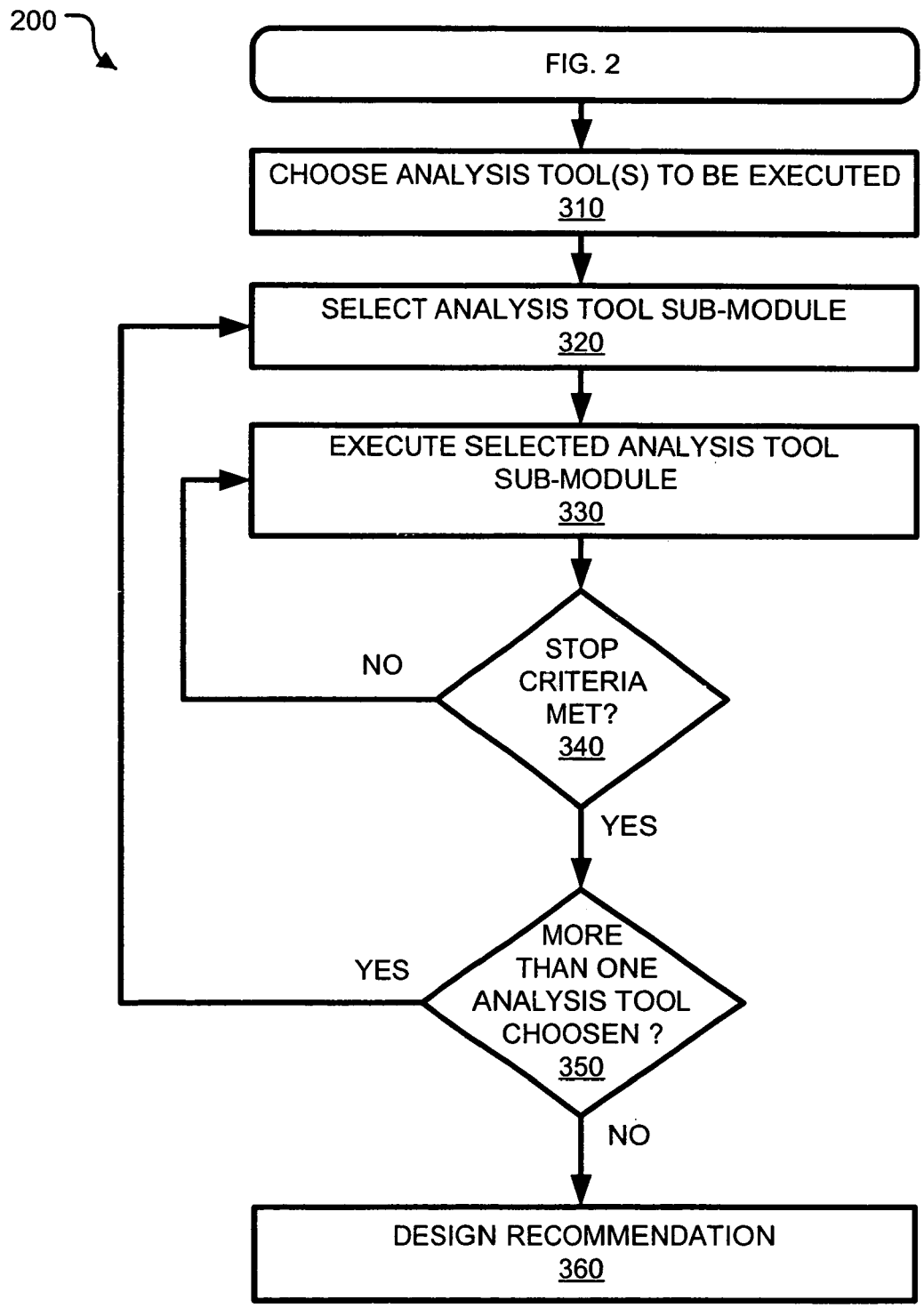
FIG. 3 is a flow diagram showing the continuation of method 200 shown in FIG. 2.
Figure 5:
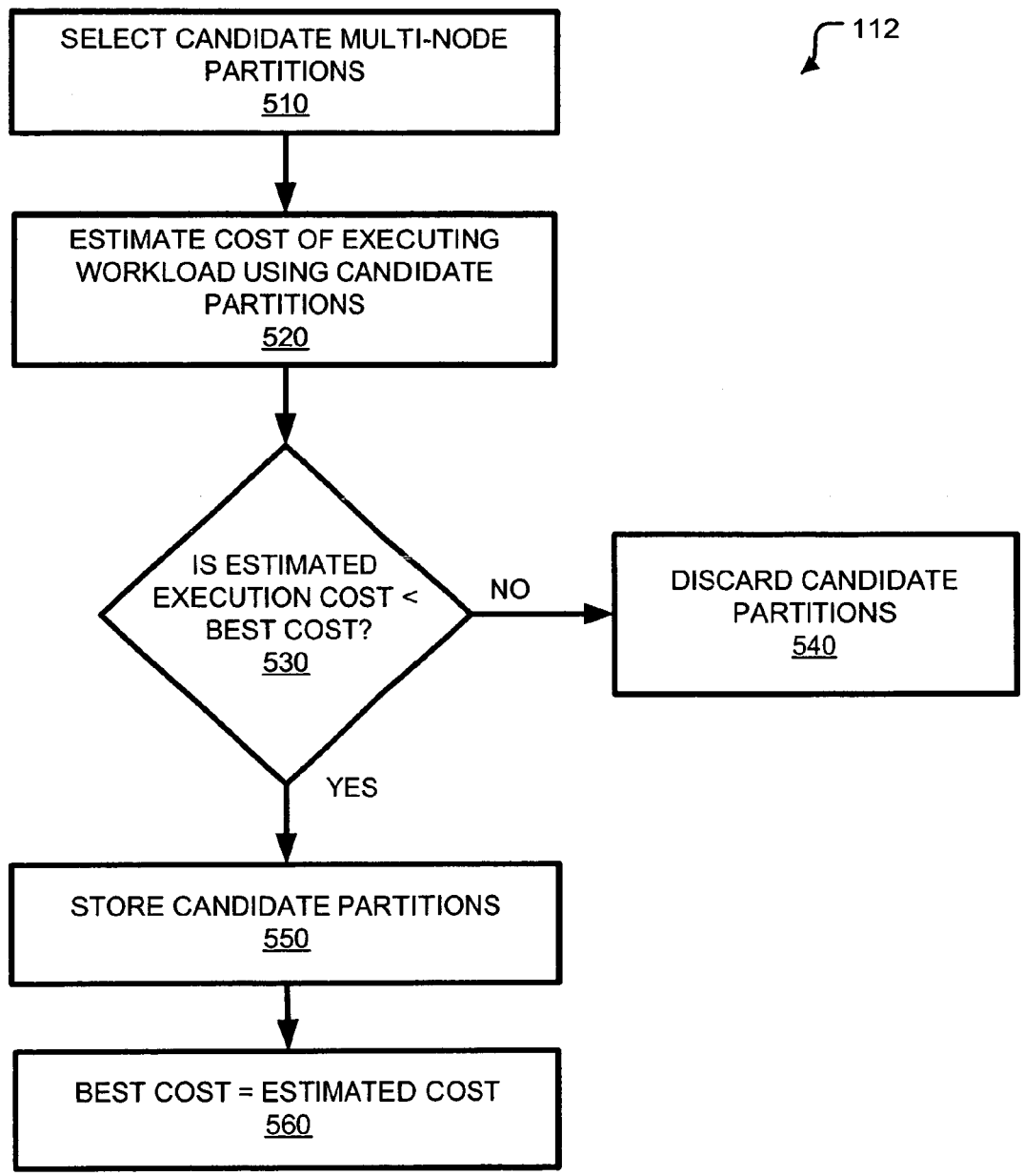
FIG. 5 is a flow diagram showing an exemplary embodiment of a multi-node partitioning analysis tool sub-module.
Figure 6:
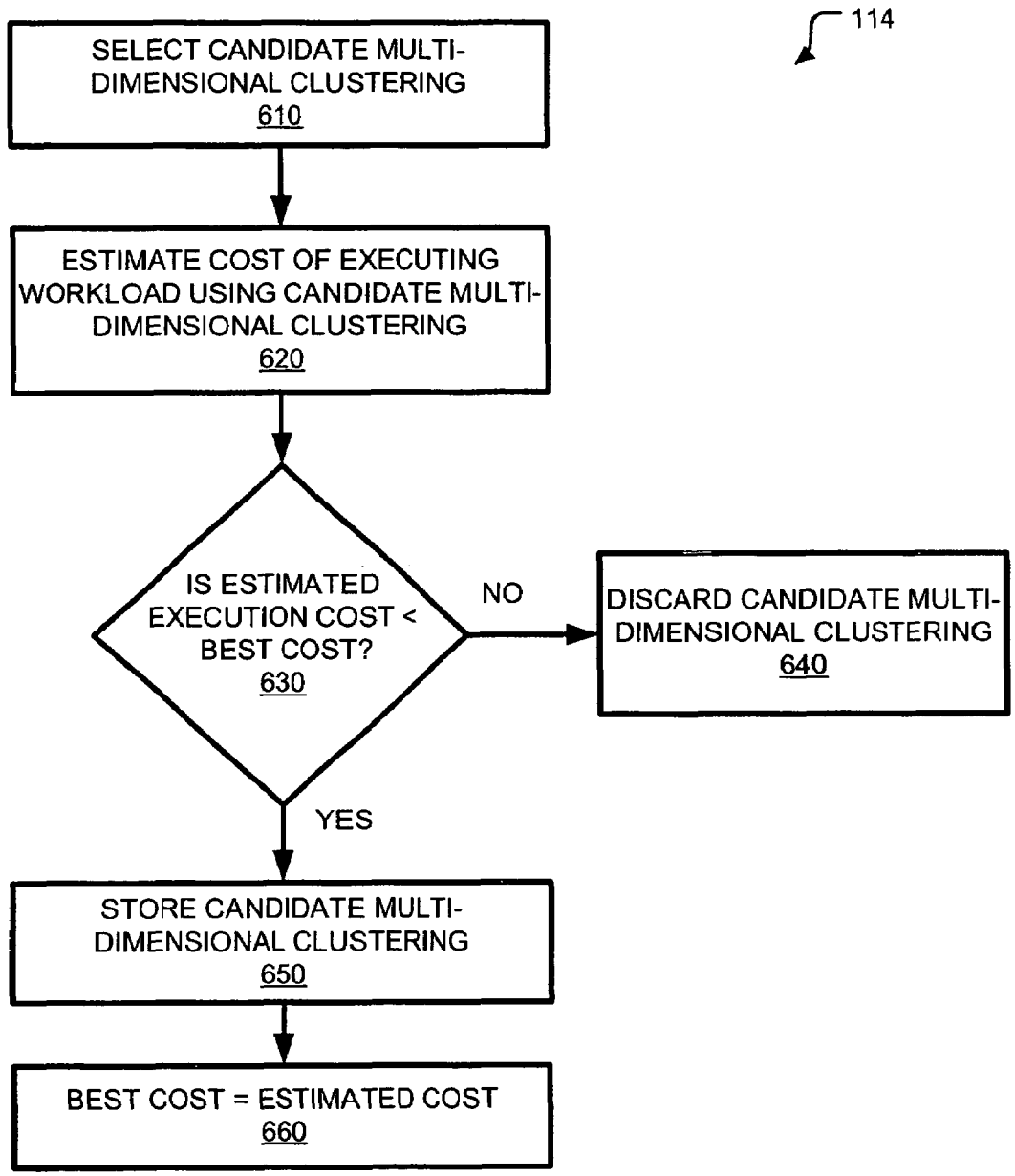
FIG. 6 is a flow diagram showing operations in an exemplary embodiment of a multi-dimensional clustering analysis tool sub-module according to the present invention.

Referring to FIG. 3, the analysis tool or sub-module that has been chosen for execution is selected at step 310. For example, an exemplary embodiment of a method for implementing materialized views and indexes analysis tool sub-module 110, which shown in FIG. 4 and discussed below, may be the first analysis tool requested for execution. An exemplary embodiment of a method for implementing multi-node partitioning analysis tool sub-module 112 is shown in FIG. 5 and discussed below. An exemplary embodiment of a method for implementing multi-dimensional clustering 114 is shown in FIG. 6 and discussed below. The execution of the materialized views and indexes analysis tool sub-module 110, multi-node partitioning analysis tool sub-module 112, and multi-dimensional clustering analysis tool sub-module 114 may be chosen for execution of the method 200 based upon configuration parameters provided during the characterization of the system or by user input provided at step 210. It may be advantageous to bypass individual sub-modules (110, 112 and 114) depending on systems and execution constraints such as disk storage space and execution time allotted for execution of the method 200 to achieve the best estimated workload performance improvement within the defined constraints. In addition, the order of execution and the number of iterations of each analysis tool sub-module are executed may be configured.

At step 320 the analysis tool sub-module (110, 112 and 114) is selected and the workload is provided to the module. At step 330 the analysis tool is executed using the workload 104 or the compressed workload from step 230. Execution of the individual analysis tools are performed until defined stop criteria such as the amount of disk space available, memory consumption or an allotted time for execution of method 200 (YES at 340) have been exceeded or met. The stop criteria may be defined for each individual analysis tool or characteristic selected. It is then determined if additional analysis tools were selected for execution at step 350. If another tool was chosen for execution (YES at 350), it is selected at step 320 and then executed at step 330. The order in which the analysis tools are selected, and the number of repetitions of the analysis tools, may also be configured. If the stop criteria has not been met (NO at 340), execution of the analysis tool continues at step 300. Once the stop criterion has been met (YES at 340) and no more analysis tools have been chosen for execution (NO at 350), the resulting design recommendations are provided at step 360 to be implemented in the configuration of the database prior to execution of the workload.

The stop criteria may also be defined as a threshold of a percentage improvement on the workload execution cost. For example, if execution of the selected analysis tool sub-module did not yield a reduction in workload execution cost, or only a limited reduction in workload execution cost such as a 1% improvement, the method can be stopped.

Upon implementation of the design recommendations provided by the analysis tools based upon the characteristics selected, the best estimated workload performance improvement will be achieved within the defined constraints.

Figure 4:
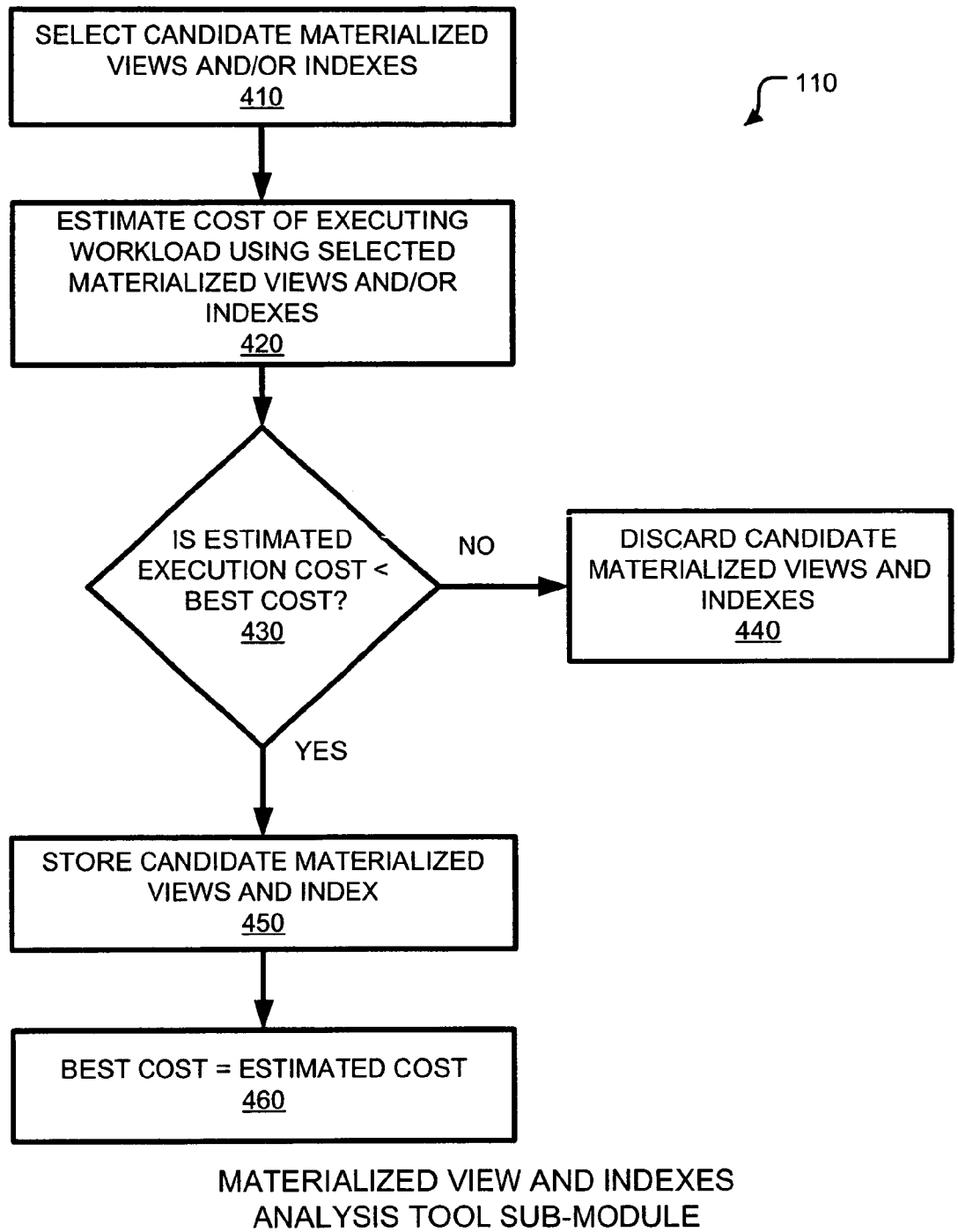
FIG. 4 is a flow diagram showing an exemplary embodiment of materialized views and indexes analysis tool sub-module.

FIG. 4 is an exemplary embodiment of a method for implementing a materialized views and indexes analysis tool sub-module 110 according to the present invention. At step 410 a set of candidate materialized views and/or indexes are selected based upon the characteristics of the workload 104, or compressed workload from step 230, and database and constraints provided at step 310. Materialized views are selected that provide improved execution cost of statements by pre-storing results of a statement or by creating summary tables. In addition, indexes that will improve access to the data within the database are also selected. A configuration parameter is provided during the characterization of the system at step 210 or by user input at step 310 to define if only materialized views are required to be selected or if only indexes are required to be selected or both. The method of selecting the materialized views and indexes 110 can be performed using any number of known techniques such as implemented in IBM's DB2 v8.2 Design Advisor™.

At step 420 an estimate of the execution cost of the workload against the database is performed using the candidate materialized views and indexes. If at step 430 the estimated execution cost is less than the 'best cost' (YES at 430), then the candidate materialized view and indexes are stored at step 450 and the new estimated execution cost now becomes the 'best cost' of execution at step 460. If the estimated execution cost does not provide an improvement over the 'best cost' (NO at 430) then the candidate materialized view and indexes are discarded. If the execution of the materialized views and indexes analysis tool sub-module has been executed independently of design characteristics determined by previously executed sub-modules, storing of the candidate partitions at step 450 may negate or override previously determined characteristics. The interaction or dependencies between selected characteristics may be defined between analysis tool sub-modules. For example, if the materialized views and index selection analysis tool sub-module has been previously executed, the recommendations are discarded if the multi-node partitions analysis tool sub-module is selected next.

FIG. 5 is an exemplary embodiment of a method for implementing multi-node partitioning analysis tool sub-module 112 according to the present invention. Candidate partitions of the database across multiple nodes, which may also be defined as number of processors available, are selected at step 510 using the workload 104 or compressed workload from step 230. The database structure is apportioned to the available processors to improve the execution cost of the workload. The method of selection of multi-node partitions 510 can be performed using any number of known techniques such as IBM's DB2 version 8.2 Data Advisor™.

At step 520 an estimate of the execution cost of the workload is performed taking into consideration database characteristics previously selected depending on how the analysis tools were previously selected at step 310. Execution of the multi-node partitioning analysis tool may also be executed independently of any previous design characteristics selected. If at step 530, the estimated execution cost is less than the 'best cost' of currently estimated execution estimated (YES at 530), then the candidate multi-node partitions are stored at step 550 and the new estimated execution cost becomes the 'best cost' of execution at step 560. If the estimated execution cost is no better than the 'best cost' (NO at 530) then the candidate multi-node partitions are discarded. As mentioned previously, storing of the candidate partitions at step 550 may negate or override characteristics previously determined by the execution of other analysis tool sub-modules such as 110 and 114 depending on the configuration implemented.

FIG. 6 is an exemplary embodiment of a method for implementing multi-dimensional clustering analysis tool sub-module 114 according to the present invention. Multi-dimensional clustering allows data to be clustered according to several different dimensions simultaneously based upon unique data sets. Candidate multi-dimensional clusters of the database are selected at step 610 using the workload 104, or compressed workload from step 230. The method of selecting multi-dimensional clusters 610 can be performed using any number of known techniques such as IBM's DB2 version 8.2 Design Advisor™.

At step 620 an estimate of the execution cost of the workload is performed taking into consideration any design characteristics that have been previously selected, or may also be executed independently of any previous design characteristics selected. If at step 630, the estimated execution cost is less than the 'best cost' of currently estimated execution estimated (YES at 630), then the candidate multi-dimensional clustering is stored at step 650 and the new estimated execution cost becomes the 'best cost' of execution at step 660. If the estimated execution cost is no better than the 'best cost' (NO at 630) then the candidate multi-dimensional clusters are discarded. As mentioned previously, the recommended characteristics may negate or override characteristics previously determined by the execution of other analysis tool sub-modules such as 110 and 112 depending on the configuration selected.

The selection of database characteristics at step 310 for execution can be performed by an iterative approach in which the analysis tools are executed one at a time for determination of the database characteristics. However, the interaction between different characteristics may not be accounted for. For example, indexes and materialized views are closely dependent on each other. Materialized views, like a regular table, normally needs indexes defined on it in order to be attractive to a query. The selection of a materialized view, on the other hand, can also make an index useless, and vice versa. As another example, in a multi-node system, a materialized view can be partitioned. The selection of the partitioning can make a materialized view more or less useful to a given query.

An alternative to the iterative approach is an integrated one, in which joint searching is performed directly in the combined search space, and heuristic rules are applied to limit the candidate sets being considered at steps 410, 510 and 610. The advantage of the integrated approach is that it can better handle the interdependencies among different characteristics. For example, by jointly enumerating indexes and materialized views together in the analysis tool 110, it is very likely to identify the optimal index and materialized views combination.

Although interdependencies between the characteristics that are selected by the analysis tools often exist, the degrees of interdependencies among different pairs of database characteristics are not always the same. For example, characteristic A 'strongly' depends on characteristic B, if a change in selection of B often results in a change in that of A. Otherwise, A 'weakly' depends on B. Weak dependencies are likely to exist because a new physical design characteristic is normally introduced to help the areas where existing characteristics do not apply or do not perform well. It's unlikely for a system to support two features that duplicate each other on functionalities.

The degree of dependencies among the four exemplary characteristics is shown Table 1, where 'S' represents strong and 'W' represents weak. For the purposes of describing the dependencies, the characteristics of the materialized views and indexes analysis tool sub-module 110 have been identified independently as the characteristics can be executed separately as described in relation to FIG. 4.

TABLE 1

Classification of dependencies of A on B

| A | B | | | |
|---|---|---|---|---|
| | Indexes | Materialized Views | Multi-Node Partitions | Multi-Dimensional Clusters |
| Indexes | | S | W | W |
| Materialized Views | S | | W | S |
| Multi-Node Partitions | W | S | | W |
| Multi-Dimensional Clusters | W | S | W | |

Materialized views and indexes mutually depend on each, and thus it's clear that their interdependencies should be classified as strong. The interaction between indexes and multi-node partitions is different. First of all, indexes for local predicates are relatively insensitive to how data is partitioned. Partitioning keys are usually determined by joins and aggregations. Next, consider those indexes selected for nested loop joins. It is true that changing which indexes are available can possibly change the join methods in the execution plan, and therefore may affect the selection of partitions. However, good partitions are more influenced by intermediate result sizes, which depend only on cardinalities and predicate selectivities (independent of the existence of indexes or not). Conversely, although the selection of a table's partitioning can potentially influence the selection of join methods and consequently the selection of indexes, such influence is not as strong as that of predicate selectivities.

Likewise a similar argument can be made on the dependencies between materialized views and partitions. The only difference is that materialized views themselves can have partitions, which makes partitions strongly dependent on materialized views, but not vice versa. The degree of dependencies between characteristics is not necessarily symmetric. The dependencies between indexes and multi-dimensional clusters are classified as weak. Indeed, multi-dimensional clusters enable and require a special kind of index.

Multi-dimensional clusters are very similar to indexes in their relationship to materialized views and partitions, which mean that multi-dimensional clusters and materialized views are strongly coupled while multi-dimensional clusters and partitions are weakly, coupled. Similar to partitioning, a materialized view can be further clustered through a multi-dimensional clusters organization.

The mutual strong dependencies are difficult to break and thus are better handled using an integrated approach. Other dependencies are decoupled (unilateral strong and weak) and an iterative approach is applied. To minimize the impact of doing so, the ordering by which the analysis tools are executed within each iteration is configurable.

In general, for a pair of characteristics A and B, if A and B are mutually strongly dependent on each other, the method can jointly search both for characteristics related to A and B. If only B strongly depends on A, A and B will be iteratively searched, but the analysis tool for A is executed before B so that B is properly influenced by A. Finally, if A and B are weakly coupled, the analysis tools can be executed separately, but can be iterated in any order. Furthermore, for the weak dependencies, each analysis tool may optionally implement a quick and simple search of a characteristic in another component to account for the weak relationship. The hybrid approach enables grouping of different characteristics into smaller components while capturing the most important interdependencies among them.

The order and grouping of by which the characteristics are selected and executed can be configured and will impact the selection of the analysis tool for execution at step 310 based upon characterization at step 210. In addition, the comparison of the execution cost to the best cost performed at steps 430, 530 and 630 may also account for characteristics that have been previously selected depending on the configuration related to the characteristic interdependencies.

Various embodiments of the present invention described above can be used for the automatic selection of database characteristics that would enhance the database design of a given database. This can be used in many different ways, for example: 1) before the database is created on a system, 2) to modify the design of a database as it is used over time, 3) to determine if changes in the workload warrant a database design change and what the change would be, 4) to determine the database design change if new system resource are added to the database system environment such as new nodes, 5) to verify if any database, workload or system changes require database design changes, or 6) to perform what-if analysis such as inflating the database statistics to make the database look like it grew by X % to determine what database design changes might result with larger/smaller database sizes and to plot out the workload changes with the designs over various values of X.

It will be appreciated that variations of some elements are possible to adapt the invention for specific conditions or functions. The concepts of the present invention can be further extended to a variety of other applications that are clearly within the scope of this invention. Having thus described the present invention with respect to preferred embodiments as implemented, it will be apparent to those skilled in the art that many modifications and enhancements are possible to the present invention without departing from the basic concepts as described in the preferred embodiment of the present invention. Therefore, what is intended to be protected by way of letters patent should be limited only by the scope of the following claims.

The invention claimed is:

1. A method of configuring a database based on a database workload having a performance metric, the method comprising:

selecting a plurality of different database characteristics based upon the database workload, each of the different database characteristics having an associated estimated performance metric for the database workload, wherein the selecting the plurality of different data base characteristics includes determining degrees of interdependencies between the different database characteristics, and determining, based on the degrees of interdependencies, the different database characteristics are searched in an integrated manner in groups with other different database characteristics, and the different database characteristics are searched in groups of one database characteristic separately from the other different database characteristics, and including defining different ones of the degrees of interdependencies as strong dependencies and weak dependencies, wherein the database characteristics that have the strong dependencies are provided in the groups having searching performed in an integrated manner, and the database characteristics that have the weak dependencies are provided in the groups having searching performed separately;

selecting a set of candidate database characteristics from the plurality of different database characteristics for which the associated estimated performance metric is lower than the database workload performance metric, wherein the set of candidate database characteristics is selected by searching each of the groups of database characteristics in an order such that groups are searched taking into consideration candidate database characteristics selected in groups searched previously in the order; and configuring the database using the selected set of candidate database characteristics.

2. The method of claim 1, wherein the plurality of different database characteristics is selected from the group consisting of: materialized views and indexes, multi-node partitions, multi-dimensional clusters, data fragmentation, statistics profiles, generated columns and constraint functional dependencies.

3. The method of claim 1, wherein the selecting of the plurality of different database characteristics and the selecting of the set of candidate database characteristics are repeatedly performed until one or more stop criteria are exceeded wherein the one or more stop criteria are selected from the group consisting: an allocated amount of storage space, an amount of memory consumption, an allocated amount of execution time and a percentage improvement in estimated workload execution cost.

4. The method of claim 1, wherein the groups of different database characteristics are ordered for selecting the set of candidate database characteristics, wherein the groups are ordered based on the degree of dependencies.

5. The method of claim 4, wherein each of the ordered groups has an associated estimated performance metric for the group, the associated estimated performance metric being determined by taking into consideration at least two of the plurality of different database characteristics.

6. The method of claim 4, wherein searching each of the groups in the order further comprises iteratively repeating the searching between ordered groups to produce a lowest associated estimated performance metric.

7. The method of claim 1, further comprising compressing the database workload prior to selection of the plurality of different database characteristics.

8. The method of claim 1, wherein the performance metric is a function of one or more parameters selected from a group consisting of: estimated execution time of a statement, amount of computer memory required for execution of a statement, amount of I/O usage required for execution of a statement, amount of CPU utilization required for execution of a statement, network utilization, and throughput contribution required for execution of a statement and combination thereof.

9. The method of claim 1, wherein the plurality of different database characteristics include materialized views, indexes, multi-node partitions, and multi-dimensional clusters.

10. The method of claim 1 wherein the determining of which of the different database characteristics are to be searched in an integrated manner and which are searched separately is according to predetermined relationships between the different database characteristics.

11. The method of claim 1 wherein a first database characteristic of database characteristics has a strong dependency on a second database characteristic of the database characteristics and the second database characteristic has a weak dependency on the first database characteristic, and wherein a group including the second database characteristic is searched in the order before a group including the first database characteristic.

12. The method of claim 1 wherein one of the degrees of interdependency is determined as strong between a first database characteristic and a second database characteristic if a change in selection of the second database characteristic often results in a change in selection of the first database characteristic, and otherwise the degree of interdependency is determined as weak.

13. An article of manufacture for configuring a database based on a database workload having a performance metric, the article of manufacture comprising:

a storage medium;

code tangibly embodied in the storage medium, the code for directing the data processing system, the code comprising:

code for selecting a plurality of different database characteristics based upon the database workload, each of the different database characteristics having an associated estimated performance metric for the database workload, wherein the selecting the plurality of different database characteristics includes determining degrees of interdependencies between the different database characteristics, and determining, based on the degrees of interdependencies, the different database characteristics are searched in an integrated manner in groups with other different database characteristics, and the different database characteristics are searched in groups of one database characteristic separately from the other different database characteristics, and defining different degrees of interdependencies as strong dependencies and weak dependencies, wherein the database characteristics that have the strong dependencies are provided in the groups having searching performed in an integrated manner with each other and the database characteristics that have the weak dependencies are provided in the groups having searching performed separately;

code for selecting a set of candidate database characteristics from the plurality of different database characteristics for which the associated estimated performance metric is lower than the database workload performance metric, wherein the set of candidate database characteristics is selected by searching each of the groups of database characteristics in an order such that groups are searched taking into consideration candidate database characteristics selected in groups searched previously in the order; and code for configuring the database using the selected set of candidate database characteristics.

14. The article of manufacture of claim 13, wherein the plurality of different database characteristics is selected from the group consisting of: materialized views and indexes, multi-node partitions, multi-dimensional clusters, data fragmentation, statistics profiles, generated columns and constraint functional dependencies.

15. The article of manufacture of claim 13, wherein the code for selecting the plurality of different database characteristics and the code for selecting the set of candidate database characteristics are repeatedly performed until one or more stop criteria are exceeded wherein the one or more stop criteria are selected from the group consisting: an allocated amount of storage space, an amount of memory consumption, an allocated amount of execution time and a percentage improvement in estimated workload execution cost.

16. The article of manufacture of claim 13 wherein the groups of plurality of different database characteristics into ordered for selecting the set of candidate database characteristics, wherein the groups are ordered based on the degree of dependencies.

17. The article of manufacture of claim 16, wherein the code for searching each of the groups in the order further comprises iteratively repeating the searching between ordered groups to produce a lowest associated estimated performance metric.

18. The article of manufacture of claim 13, further comprising code for compressing the database workload prior to selection of the plurality of different database characteristics.

19. The article of manufacture of claim 13, wherein the performance metric is a function of one or more parameters selected from a group consisting of: estimated execution time of a statement, amount of computer memory required for execution of a statement, amount of I/O usage required for execution of a statement, amount of CPU utilization required for execution of a statement, network utilization, and throughput contribution required for execution of a statement and combination thereof.

20. The article of manufacture of claim 13, wherein the plurality of different database characteristics include materialized views, indexes, multi-node partitions, and multi-dimensional clusters.

21. A data processing system having memory for storing a database, the data processing system for configuring the database based on a database workload having a performance metric, the data processing system comprising:

means for selecting a plurality of different database characteristics based upon the database workload, each of the different database characteristics having an associated estimated performance metric for the database workload, wherein the selecting the plurality of different database characteristics includes determining degrees of interdependencies between the different database characteristics, and determining, based on the degrees of interdependencies, the different database characteristics are searched in an integrated manner in groups with other different database characteristics, and the different database characteristics are searched in groups of one database characteristic separately from the other different database characteristics, and defining different ones of the degrees of interdependencies as strong dependencies and weak dependencies, wherein the database characteristics that have the strong dependencies are provided in the groups having searching performed in an integrated manner, and the database characteristics that have the weak dependencies are provided in the groups having searching performed separately;

means for selecting a set of candidate database characteristics from the plurality of different database characteristics for which the associated estimated performance metric is lower than the database workload performance metric, wherein the set of candidate database characteristics is selected by searching each of the groups of database characteristics in an order such that groups are searched taking into consideration candidate database characteristics selected in groups searched previously in the order; and means for configuring the database using the selected set of candidate database characteristics.

22. The system of claim 21, wherein the plurality of different database characteristics is selected from the group consisting of: materialized views and indexes, multi-node partitions, multi-dimensional clusters, data fragmentation, statistics profiles, generated columns and constraint functional dependencies.

23. The system of claim 21, wherein the means of selecting the plurality of different database characteristics and the means of selecting the set of candidate database characteristics are repeatedly performed until one or more stop criteria are exceeded wherein the one or more stop criteria are selected from the group consisting: an allocated amount of storage space, an amount of memory consumption, an allocated amount of execution time and a percentage improvement in estimated workload execution cost.

24. The system of claim 21, wherein the groups of different database characteristics are ordered for selecting the set of candidate database characteristics, wherein the groups are ordered based on the degree of dependencies.

25. The system of claim 24, wherein the means for searching each of the groups in the order further comprises iteratively repeating the searching between ordered groups to produce a lowest associated estimated performance metric.

26. The system of claim 21, further comprising means for compressing the database workload prior to selection of the plurality of different database characteristics.

27. The system of claim 21, wherein the performance metric is a function of one or more parameters selected from a group consisting of: estimated execution time of a statement, amount of computer memory required for execution of a statement, amount of I/O usage required for execution of a statement, amount of CPU utilization required for execution of a statement, network utilization, and throughput contribution required for execution of a statement and combination thereof.

28. The data processing system of claim 21, wherein the plurality of different database characteristics include materialized views, indexes, multi-node partitions, and multi-dimensional clusters.

* * * * *